(12) United States Patent
Tozu et al.

(10) Patent No.: US 6,328,390 B1
(45) Date of Patent: Dec. 11, 2001

(54) BRAKE CONTROL SYSTEM FOR A VEHICLE

(75) Inventors: Kenji Tozu, Yokkaichi; Takayuki Itoh, Nagoya; Masanobu Fukami, Haza gun; Satoshi Yokoyama, Anjo, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/195,672

(22) Filed: Nov. 19, 1998

(30) Foreign Application Priority Data

Nov. 21, 1997 (JP) .................................................. 9-337908

(51) Int. Cl.$^7$ ...................................................... B60T 8/34
(52) U.S. Cl. ................................... 303/113.5; 303/119.1; 303/163; 303/169; 303/113.1
(58) Field of Search .................................. 303/163, 186, 303/187, 188, 113.1, 113.4, 116.1, 115.1, 115.4, 148, 149, 165, 113.2, 169, 139, 113.5, 119.1

(56) References Cited

U.S. PATENT DOCUMENTS

| | | | |
|---|---|---|---|
| 4,715,663 | * 12/1987 | Hattori et al. | 303/116.2 |
| 4,872,731 | * 10/1989 | Nakamura | 303/115.4 |
| 4,880,282 | * 11/1989 | Makino et al. | 303/116.2 |
| 5,029,949 | * 7/1991 | Buschmann et al. | 303/156 |
| 5,169,214 | * 12/1992 | Holzmann et al. | 303/116.1 |
| 5,275,476 | * 1/1994 | Maisch | 303/116.1 |
| 5,328,256 | * 7/1994 | Ohta et al. | 303/146 |
| 5,385,395 | * 1/1995 | Volz | 303/116.1 |
| 5,474,369 | 12/1995 | Inagaki et al. | 303/155 |
| 5,540,298 | * 7/1996 | Yoshioka et al. | 303/193 |
| 5,584,540 | * 12/1996 | Takeuchi et al. | 303/116.1 |
| 5,673,979 | * 10/1997 | Kuromitsu et al. | 303/116.1 |
| 5,727,852 | * 3/1998 | Pueschel et al. | 303/113.4 |
| 5,741,051 | * 4/1998 | Nakashima et al. | 303/141 |
| 6,007,163 | * 12/1999 | Sawada | 303/116.2 |

FOREIGN PATENT DOCUMENTS

| | | |
|---|---|---|
| 4012168 | 10/1991 | (DE) . |
| 4400704 | 7/1994 | (DE) . |
| 19619381 | 11/1997 | (DE) . |
| 805085 | 11/1997 | (EP) . |
| 64-16461 | * 1/1989 | (JP) . |
| 8-230634 | 9/1996 | (JP) . |

* cited by examiner

*Primary Examiner*—Robert J. Oberleitner
*Assistant Examiner*—Thomas J. Williams
(74) *Attorney, Agent, or Firm*—Burns, Doane, Swecker & Mathis, LLP

(57) ABSTRACT

The present invention is directed to a brake control system for a vehicle, wherein a first valve device for opening or closing a main passage, a hydraulic pressure pump, and a second valve device for opening or closing an auxiliary passage are disposed in each hydraulic pressure circuit of a dual hydraulic pressure circuit system. At least one of the first and second valve devices is controlled to equalize the slip rates of a pair of wheels, with the wheel brake cylinders operatively mounted thereon and disposed in different hydraulic circuits, and placed at the left side and right side of the vehicle, respectively, when a difference between the slip rates of the wheels placed at the left side and right side exceeds a predetermined value.

5 Claims, 3 Drawing Sheets

BRAKE CONTROL SYSTEM FOR A VEHICLE

This application claims priority under 35 U.S.C. Sec. 119 to No.9-337908 filed in Japan on Nov. 21, 1997, the entire content of which is herein incorporated by reference.

BACKGROUND OF THE INVENTION

1. Field of the Invention

The present invention relates to a brake control system for a vehicle, which is adapted to increase the braking force applied to wheels automatically, if necessary, when a brake pedal is depressed.

2. Description of the Related Arts

According to a known brake-assist control system, in the case where a vehicle driver depressed a brake pedal rapidly or deeply when driving the vehicle, the braking force applied to each wheel is increased so as to assist the driver to apply the braking force to the wheel. The conventional brake-assist control system is usually adapted to control a boosting power of a vacuum booster. For example, a Japanese Patent Laid-open Publication No.8-230634 discloses a system for performing a brake-assist control by means of a hydraulic pressure pump for use in an anti-skid control system. In that publication, a method and apparatus for controlling the anti-lock control system or a traction control system are proposed to save the power of the vacuum booster fully or partially. Also, in that publication, a dual hydraulic pressure circuit system is employed between a master cylinder and wheel brake cylinders, and a return pump is disposed in a passage in each hydraulic pressure circuit, while other structure is not clear, due to its insufficient description.

According to the brake system which divides the hydraulic pressure circuit between the master cylinder and the wheel brake cylinder into two hydraulic pressure circuits, and disposes the pressure pump in each circuit to be used as an auxiliary pressure source, the hydraulic braking pressure in each circuit is varied, because the characteristic of one of the pumps is different from that of the other pump. Therefore, especially in the diagonal hydraulic pressure circuit (X-circuit), the braking forces applied to the left and right wheels are different from each other, so that the stability of the vehicle might be deteriorated. In order to solve this problem, an input valve and an output valve as disclosed in that publication may be controlled with respect to each wheel. However, those valves are to be controlled so as to reduce the variation of the auxiliary pressure in addition to the control of the input valves and output valves used in the anti-lock control, so that noise caused in controlling the operation of those valves shall not be neglected.

SUMMARY OF THE INVENTION

Accordingly, it is an object of the present invention to provide a brake control system which is arranged to divide a hydraulic pressure circuit between a master cylinder and wheel brake cylinders into two hydraulic pressure circuits, and dispose a hydraulic pressure pump in each hydraulic pressure circuit, and which is adapted to increase the braking force automatically, if necessary, by controlling as small number of valves as possible, so as to equalize the hydraulic braking pressure fed from the hydraulic pressure pump into each hydraulic pressure circuit, when a brake pedal is depressed.

In accomplishing the above and other objects, a brake control system for a vehicle includes wheel brake cylinders operatively mounted on front and rear wheels of the vehicle, respectively, a master cylinder for pressurizing brake fluid to supply braking pressure to the wheel brake cylinders in response to depression of a brake pedal, a pair of main passages for communicating the master cylinder with the wheel brake cylinders to provide a dual hydraulic pressure circuit system. A pair of first valve devices are provided for opening or closing the main passages, respectively. A pair of pressure pumps are disposed between the first valve devices and the wheel brake cylinders in the main passages, respectively. The pressure pump is adapted to introduce from an inlet thereof the brake fluid and pressurize the brake fluid to supply the hydraulic braking pressure to the wheel brake cylinders. A pair of auxiliary passages are provided for communicating each inlet of the pump with the master cylinder. A pair of second valve devices are provided for opening or closing the auxiliary passages, respectively. Wheel speed sensors are provided for detecting wheel speeds of the wheels, and a slip rate calculation device is provided for calculating slip rates of the wheels on the basis of the wheel speeds detected by the wheel speed sensors. And, a controller is adapted to control at least one of the first valve device and the second valve device to equalize the slip rates of a pair of wheels, with the wheel brake cylinders operatively mounted thereon and disposed in different hydraulic pressure circuits, and placed at the left side and right side of the vehicle, respectively, when a difference between the slip rates of the wheels placed at the left side and right side of the vehicle exceeds a predetermined value.

The controller may be adapted to calculate a deceleration difference between a desired vehicle deceleration and an estimated vehicle deceleration calculated on the basis of the wheel speeds detected by the wheel speed sensors, and set a first duty of the first valve device and a second duty of the second valve device in accordance with the deceleration difference. Accordingly, by controlling the second duty of the second valve device, with the first valve device placed in its closed position, or controlling the first duty of the first valve device, with the second valve device placed in its closed position, the hydraulic braking pressure in the wheel brake cylinder of each of the wheels is controlled equalize the slip rates of the wheels. The present system is especially effective to the front left and right wheels in the diagonal hydraulic pressure circuit system.

The brake control system may further include a modulator which is disposed between the master cylinder and the wheel brake cylinders in each of the hydraulic pressure circuits for modulating the hydraulic braking pressure in each of the wheel brake cylinders in accordance with a pressure mode selected from at least a pressure increasing mode and a pressure decreasing mode. Each inlet of the pressure pump is connected with a passage between the modulator and the first valve device in each hydraulic pressure circuit.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENT

Figure 1:
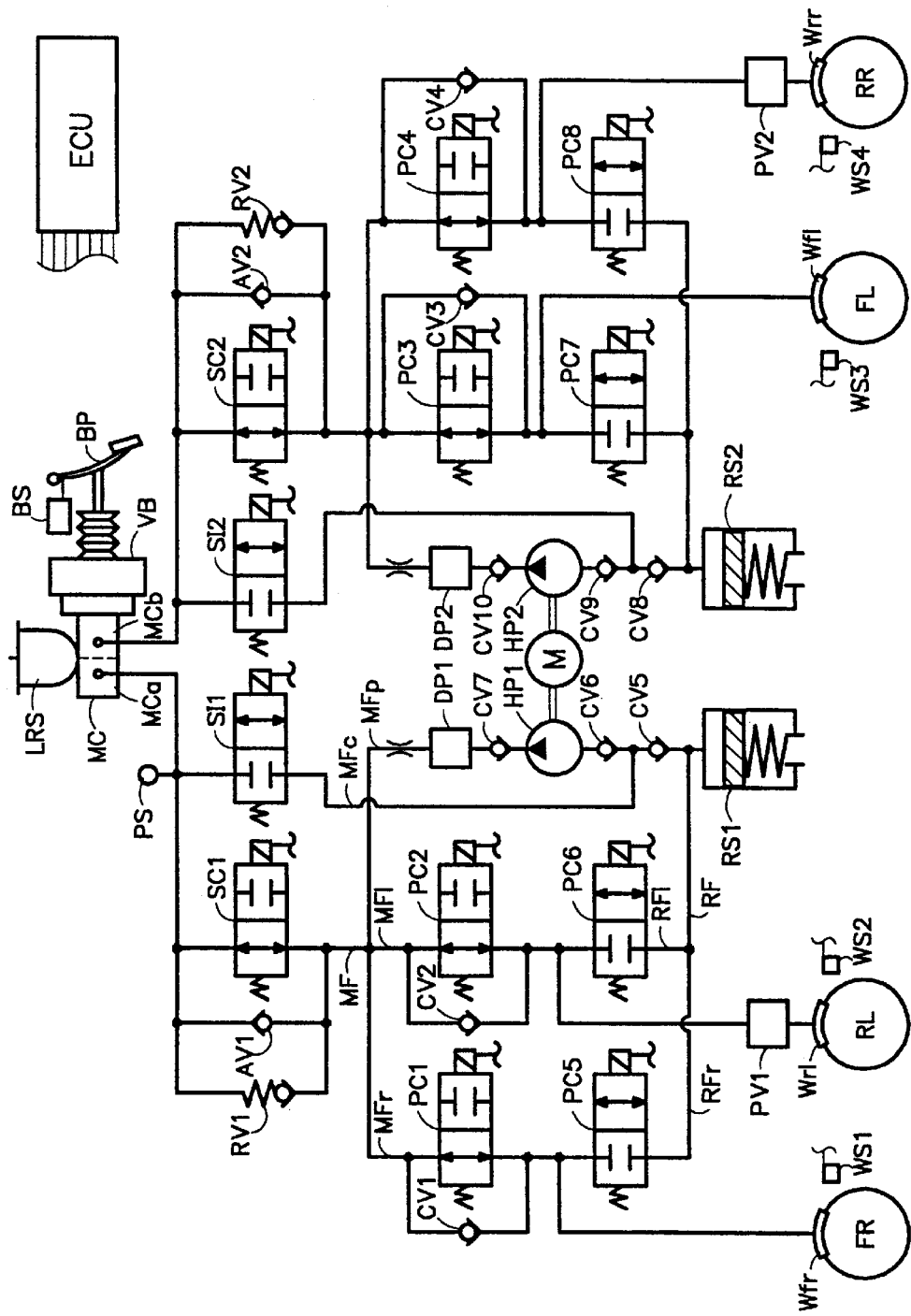
FIG. 1 is a block diagram illustrating a brake control system according to an embodiment of the present invention.

Referring to FIG. 1, there is schematically illustrated a brake control system according to the present invention, wherein wheel brake cylinders Wfl, Wfr, Wrl, Wrr are operatively mounted on the front wheels FL, FR and rear wheels RL, RR of the vehicle, respectively. The wheel FL designates the wheel at the front left side as viewed from the position of a driver's seat, the wheel FR designates the wheel at the front right side, the wheel RL designates the wheel at the rear left side, and the wheel RR designates the wheel at the rear right side.

According to the present embodiment, a master cylinder MC is activated through a vacuum booster VB in response to depression of a brake pedal BP to pressurize the brake fluid in a low-pressure reservoir LRS and discharge the master cylinder pressure to the hydraulic pressure circuits for the wheels FR, RL and the wheels FL, RR, respectively. The master cylinder is of a tandem type having two pressure chambers communicated with two hydraulic pressure circuits, respectively. That is, a first pressure chamber MCa is communicated with the hydraulic pressure circuit for the wheels FR, RL, and a second pressure chamber MCb is communicated with the hydraulic pressure circuit for the wheels FL, RR. Thus, according to the present embodiment, the hydraulic pressure circuit system is divided into two circuits to provide the diagonal circuit (X-circuit).

In the hydraulic pressure circuit for the wheels FR, RL, the first pressure chamber MCa is communicated with wheel brake cylinders Wfr, Wrl respectively, through a main passage MF and its branch passages MFr, MFl. A normally open first solenoid valve SC1 (hereinafter, simply referred to as a solenoid valve SC1, and represented by SC* for two circuits) is disposed in the main passage MF, to act as a so-called cut-off valve. Also, the first pressure chamber MCa is communicated through an auxiliary passage MFc with check valves CV5, CV6, which will be described later. A normally closed second solenoid valve SI1 (hereinafter, simply referred to a solenoid valve SI1, and represented by SI* for two circuits) is disposed in the auxiliary passage MFc. Each of the solenoid valves SC1, SI1 is formed by a two-port two-position solenoid operated valve. In the main passage MF, a pressure sensor PS is connected to detect the master cylinder pressure, which is output to an electronic controller ECU, as a signal varied in response to depression of the brake pedal BP. As for the sensor for detecting the operating condition of the brake pedal BP, a stroke sensor for detecting the stroke of the brake pedal BP may be employed.

And, normally open two-port two-position solenoid valves PC1, PC2 (hereinafter, simply referred to as solenoid valves PC1, PC2) are disposed in the branch passages MFr, MFl, respectively, and in parallel therewith check valves CV1, CV2, respectively. The check valve CV1, CV2 are provided for allowing the flow of the brake fluid toward the master cylinder MC and preventing the flow toward the wheel brake cylinders Wfr, Wrl. The brake fluid in the wheel brake cylinders Wfr, Wrl is returned to the master cylinder MC, and then to the low-pressure reservoir LRS through the check valves CV1, CV2 and the solenoid valve SC1 placed in its open position as shown in FIG. 1. Accordingly, if the brake pedal BP is released, the braking pressure in the wheel brake cylinders Wfr, Wrl is rapidly reduced to the pressure lower than the pressure at the master cylinder MC. And, normally closed two-port two-position solenoid valves PC5, PC6 (hereinafter, simply referred to as solenoid valves PC5, PC6) are disposed in the branch passages RFr, RFl, respectively, which merge into the drain passage RF connected to the reservoir RS1.

In the hydraulic pressure circuit for the wheels FR, RL, the solenoid valves PC1, PC2, and solenoid valves PC5, PC6 form the modulators of the present invention, respectively. A hydraulic pressure pump HP1 is disposed in a passage MFp connected to the branch passages MFr, MFl at the upstream of the solenoid valves PC1, PC2, and an outlet of the pressure pump HP1 is connected to the solenoid valves PC1, PC2 through a check valve CV7. The pressure pump HP1 and a pressure pump HP2 in the other hydraulic pressure circuit are driven by a single electric motor M to introduce the brake fluid from the inlets, pressurize the brake fluid to a predetermined pressure, and discharge it from the outlets. The reservoir RS1 is disposed independently from the low-pressure reservoir LRS of the master cylinder MC, and provided with a piston and spring to function as an accumulator for storing a necessary volume of the brake fluid for various controls.

The master cylinder MC is connected to a position between the check valves CV5 and CV6 disposed at the inlet side of the pressure pump HP1 through the passage MFc. The check valve CV5 is provided for preventing the flow of the brake fluid toward the reservoir RS1 and allowing the reverse flow. The check valves CV6, CV7 are provided for restricting the flow of the brake fluid discharged from the pressure pump HP1 to a predetermined direction, and normally formed within the pressure pump HP1 in a body. Accordingly, the solenoid valve SI1 is normally placed in the closed position as shown in FIG. 1 where the communication between the master cylinder MC and the inlet of the pressure pump HP1 is blocked, and switched to the open position where the master cylinder MC is communicated with the inlet of the pressure pump HP1.

In parallel with the solenoid valve SC1, is disposed a relief valve RV1 which prevents the brake fluid in the master cylinder MC from flowing toward the solenoid valves PC1, PC2, and allows the brake fluid to flow toward the master cylinder MC when the braking pressure at the solenoid valves PC1, PC2 is more than the braking pressure at the master cylinder MC by a predetermined pressure difference, and a check valve AV1 which allows the flow of the brake fluid toward the wheel brake cylinders Wfr, Wrl, and prevents its reverse flow. The relief valve RV1 is provided for returning the brake fluid to the low-pressure reservoir LRS through the master cylinder MC when the pressurized braking pressure discharged from the pressure pump HP1 is more than the braking pressure discharged from the master cylinder MC by the predetermined pressure difference, thereby to modulate the braking pressure in the main passage MF not to exceed a predetermined pressure. Because of the check valve AV1, even if the solenoid valve SC1 is in its closed position, when the brake pedal BP is depressed, the hydraulic braking pressure in the wheel brake cylinders Wfr, Wrl is increased. A damper DP1 is disposed at the outlet side of the pressure pump HP1, and a proportioning valve PV1 is disposed in a passage connected to the rear wheel brake cylinder Wrl.

In the hydraulic pressure circuit for the wheels FL, RR, are disposed a reservoir RS2, damper DP2, proportioning valve PV2, normally open two-port two-position solenoid valve SC2 (first solenoid valve), normally closed two-port two-position solenoid valves SI2 (second solenoid valve), PC7, PC8, normally open two-port two-position solenoid valves PC3, PC4, check valves CV3, CV4, CV8-CV10, relief valve RV2, and check valve AV2. The pressure pump HP2 is driven by the electric motor M together with the pressure pump HP1, both of the pumps HP1 and HP2 will be driven continuously after the motor M starts to operate them. The solenoid valves SC1, SC2, SI1, SI2 and PC1–PC8 are controlled by the electronic controller ECU to perform the control modes such as the anti-skid control mode.

In operation, the valves are placed in their normal positions and the motor M is stopped as shown in FIG. 1, during the normal braking operation. When the brake pedal BP is depressed in the conditions as shown in FIG. 1, the master cylinder MC is actuated to discharge the master cylinder pressure from the first and second pressure chambers MCa, MCb to the hydraulic pressure circuit for the wheels FR, RL, and the hydraulic pressure circuit for the wheels FL, RR, respectively, and supply the pressure into the wheel brake cylinders Wfr, Wrl, Wfl, Wrr, through the solenoid valves SC1, SC2 and the solenoid valves PC1–PC8. Since the hydraulic pressure circuits for the wheels FR, RL and wheels FL, RR are substantially the same, only the hydraulic pressure circuit for the wheels FR, RL will be explained hereinafter.

During the braking operation, when the wheel FR tends to be locked for example, and the anti-skid control is initiated, the solenoid valve PC1 is changed to its closed position, and the solenoid valve PC5 is placed in its open position, while the solenoid valve SC1 is placed in its open position. As a result, the brake fluid in the wheel brake cylinder Wfr is drained into the reservoir RS1 through the solenoid valve PC5 to reduce the pressure in the wheel brake cylinder Wfr. When a pulse pressure increase mode is selected for the wheel brake cylinder Wfr, the solenoid valve PC5 is placed in its closed position and the solenoid valve PC1 is placed in its open position, so that the master cylinder pressure is supplied from the master cylinder MC to the wheel brake cylinder Wfr through the solenoid valve PC1 in its open position. Then, the solenoid valve PC1 is opened and closed alternately, so that the pressure in the wheel brake cylinder Wfr is increased and held repeatedly like pulses thereby to be increased gradually. When a rapid pressure increase mode is selected for the wheel brake cylinder Wfr, the solenoid valve PC5 is placed in the closed position, and then the solenoid valve PC1 is placed in its open position, so that the master cylinder pressure is supplied from the master cylinder MC to the wheel brake cylinder Wfr. When the brake pedal BP is released and the master cylinder pressure comes to be lower than the pressure in the wheel brake cylinder Wfr, the brake fluid in the wheel brake cylinder Wfr is returned to the master cylinder MC through the check valve CV1 and the solenoid valve SC1 in its open position, and consequently to the low pressure reservoir LRS. Thus, an independent braking force control is performed with respect to each wheel.

Wheel speed sensors WS1 to WS4 are provided for the wheels FR, RL, FL and RR, respectively, and connected to the electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed, and turns off when the brake pedal BP is released. Also, the pressure sensor PS is connected to the electronic controller ECU, so that the signal indicative of the master cylinder pressure is input to the electronic controller ECU. The electronic controller ECU is provided with a microcomputer (not shown) which includes a central processing unit (CPU), memories (ROM, RAM), an input port, an output port, and etc. The signals detected by each of the wheel speed sensors WS1 to WS4, brake switch BS and etc. are fed to the input port via respective amplification circuits (not shown) and then to the central processing unit. Then, control signals are fed from the output port to the solenoid valves as described later via the respective driving circuits (not shown). In the electronic controller ECU, the memory (ROM) memorizes a program corresponding to flowcharts shown in FIGS. 2, 3, the central processing unit (CPU) executes the program while the ignition switch (not shown) is closed, and the memory (RAM) temporarily memorizes variable data needed to execute the program.

Figure 2:
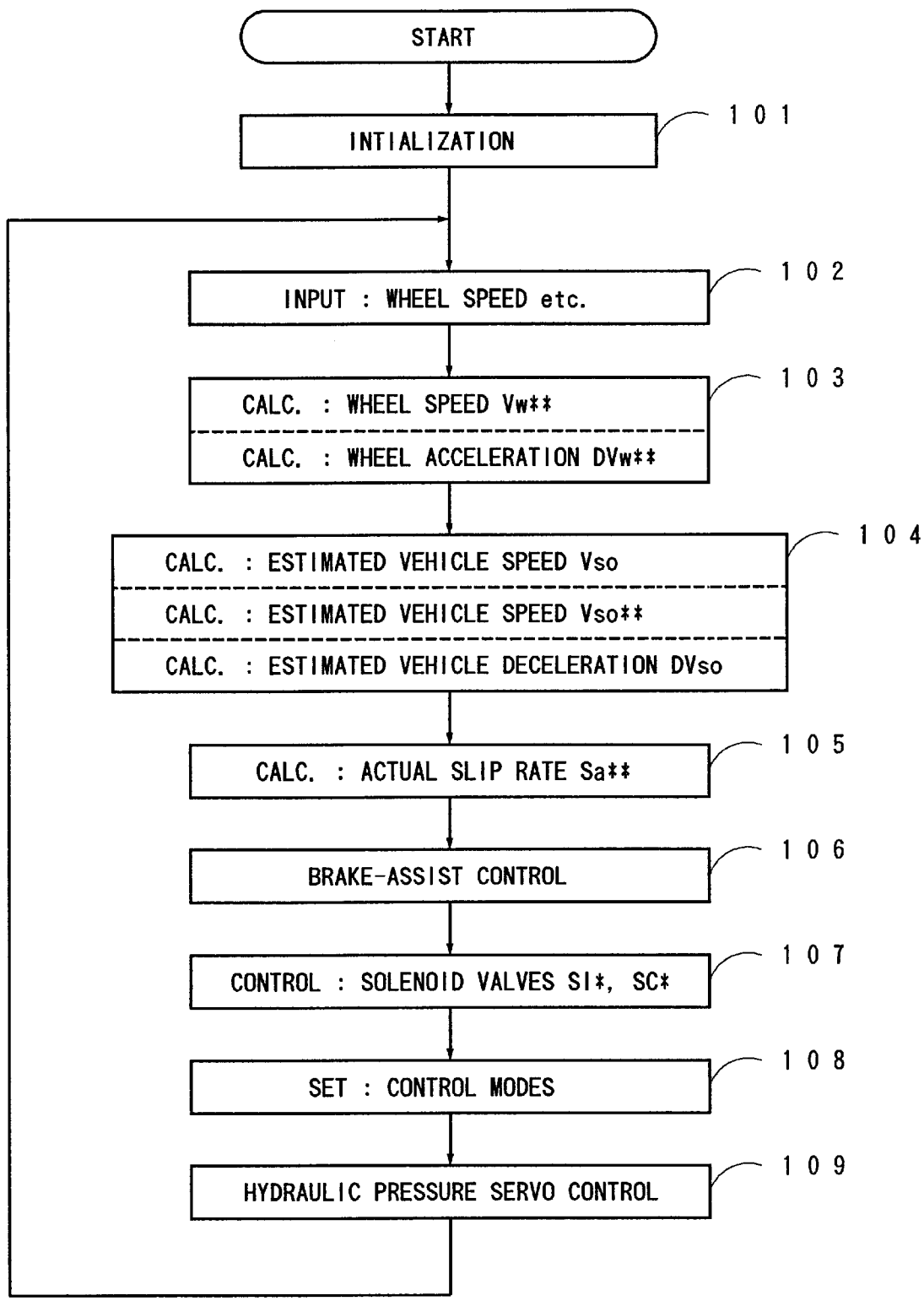
FIG. 2 is a flowchart showing a main routine of the control according to an embodiment of the present invention.

According to the present embodiment as constituted above, a program routine for the vehicle motion control including the brake-assist control by braking, anti-skid control and so on is executed by the electronic controller ECU, as will be described hereinafter with reference to FIGS. 2, 3. The program routine starts when an ignition switch (not shown) is turned on. At the outset, the program provides for initialization of the system at Step 101 to clear various data. At Step 102, the signals detected by the wheel speed sensors WS1 to WS4 are read by the electronic controller ECU. Then, the program proceeds to Step 103 where the wheel speed Vw ( represents one of the wheels FL, FR, RL, RR) of each wheel is calculated, and differentiated to provide the wheel acceleration DVw. At Step 104, the maximum of the wheel speeds Vw for four wheels is calculated to provide an estimated vehicle speed Vso on a gravity center of the vehicle (Vso=MAX[Vw]), and an estimated vehicle speed Vso is calculated for each wheel, respectively, on the basis of the wheel speed Vw. The estimated vehicle speed Vso may be normalized to reduce the error caused by a difference between the wheels located on the inside and outside of the curve while cornering. Furthermore, the estimated vehicle speed Vso is differentiated to provide an estimated vehicle deceleration DVso. In this respect, the estimated vehicle deceleration is used for the convenience of explanation. When its sign is opposite, it indicates an estimated vehicle acceleration. At Step 105, also calculated is an actual slip rate Sa on the basis of the wheel speed Vw for each wheel and the estimated vehicle speed Vso** (or, the estimated and normalized vehicle speed) which are calculated at Steps 103 and 104, respectively, in accordance with the following equation:

$$Sa^{}=(Vso^{}-Vw^{})/Vso^{}$$

Figure 4:
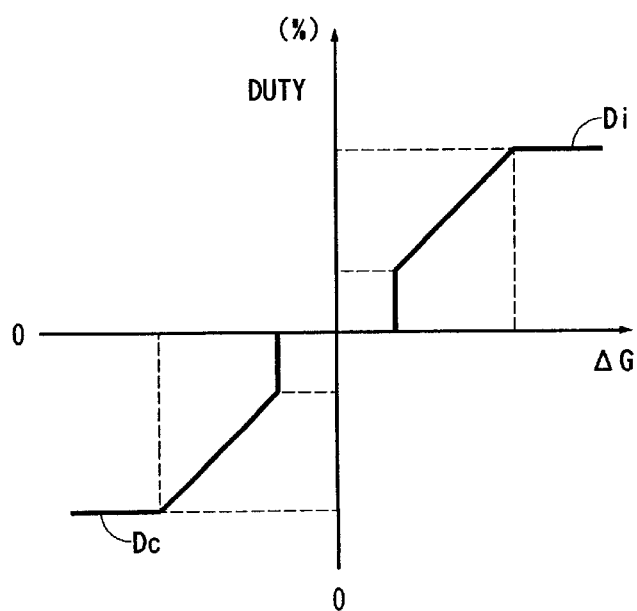
FIG. 4 is a diagram showing an example of operation of the solenoid valves SI*, SC* to control the wheel cylinder pressure for each front wheel according to an embodiment of the present invention.

Next, at Step 106, the brake-assist control is excuted, wherein a deceleration Δg, which is provided in accordance with a predetermined hydraulic braking pressure for the brake-assist control, is added to a deceleration (Gm), which is provided in accordance with the master cylinder pressure detected by the pressure sensor PS, thereby to set a desired vehicle deceleration G*. Or, this may be set on the basis of a stroke of the brake pedal BP detected by the stroke sensor (not shown). Then, a deceleration difference ΔG between the desired vehicle deceleration G* and the estimated vehicle deceleration DVso which represents the actual vehicle deceleration is calculated (ΔG=G*−DVso). This deceleration difference ΔG is used for the difference to be controlled, to calculate the amount of the brake-assist control. For example, the duty Di, Dc are set for the solenoid valves SI*, SC* in accordance with the difference ΔG as shown in FIG. 4. At Step 106, therefore, if the deceleration difference ΔG is of a positive value, the solenoid valve SC* is closed, and the solenoid valve SI* is controlled in accordance with the duty Di. On the contrary, if the deceleration difference ΔG is of a negative value, the solenoid valve SI* is closed, and the solenoid valve SC* is controlled in accordance with the duty Dc.

Then, the solenoid valves SI*, SC* are controlled at Step 107, as will be described later with reference to FIG. 3. And, the program proceeds to Step 108, where various control modes such as the anti-skid control mode are set, and the desired slip rates therefor are provided. Then, on the basis of the desired slip rates as set in the above, the hydraulic pressure servo control is executed at Step 109. After the braking force to each wheel has been controlled, with the motor M activated to discharge the pressurized brake fluid from the pressure pumps HP1, HP2, and with the solenoid vales controlled, the program returns to Step 102.

Figure 3:
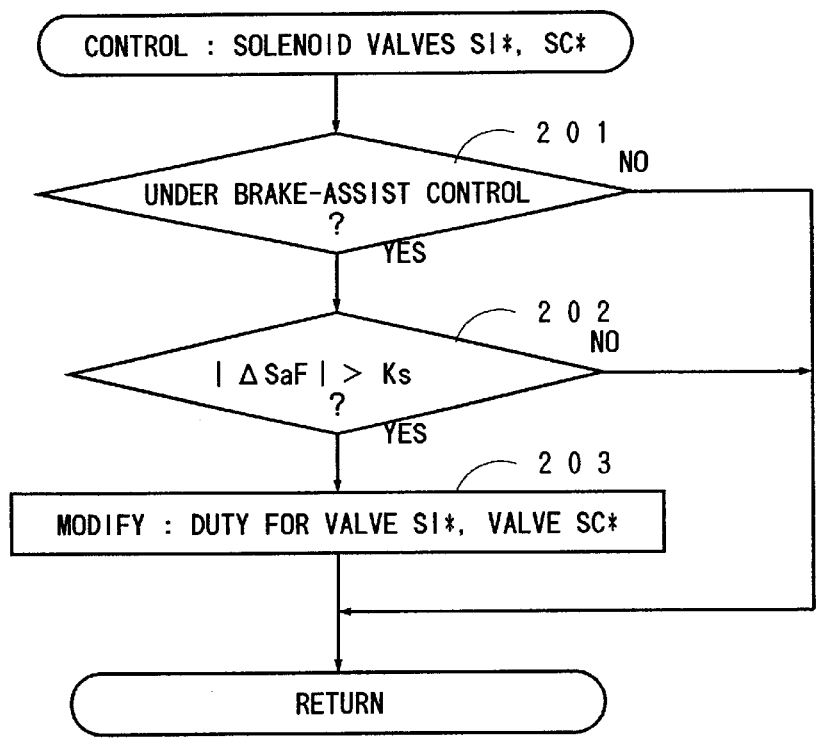
FIG. 3 is a flowchart showing a sub-routine for controlling solenoid valves SI*, SC* according to an embodiment of the present invention.

FIG. 3 shows the control of the solenoid valves SI*, SC* executed at Step 107. At the outset, it is determined at Step 201 whether the brake-assist control is being performed (i.e., under control). If the brake-assist control is being performed, the program proceeds to Step 202, where a difference ΔSaF between the actual slip rate SaFR of the front right wheel FR and the actual slip rate SaFL of the front left wheel FL is calculated at Step 105 (ΔSaF=SaFR−SaFL), and the difference ΔSaF is compared with a predetermined value Ks. As a result, if it is determined that the absolute value of the difference ΔSaF is greater than the predetermined value Ks, the program further proceeds to Step 203, otherwise it returns to the main routine in FIG. 2. When it is determined at Step 201 that the brake-assist control is not being performed, the program returns to the main routine.

At Step 203, the duties Di, Dc for the solenoid valves SI*, SC* are modified in accordance with the difference ΔSaF between the actual slip rate SaFR and actual slip rate SaFL. In this case, both of the duty Di and duty Dc for the solenoid valves SI*, SC* in two hydraulic pressure circuits may be modified, while only the duty Di for the solenoid valve SI* may be modified. Or, the duty Di for the solenoid valve SI* only in one of the hydraulic pressure circuits may be modified. With respect to the solenoid valve SI* disposed in the hydraulic pressure circuit including the wheel brake cylinder Wfr of the right wheel FR, for example, the duty Di is modified to be the one added to the duty Di set in accordance with FIG. 4, by K1·(SaFL−SaFR)/2, wherein "K1" is a constant. With respect to the solenoid valve SI* disposed in the hydraulic pressure circuit including the wheel brake cylinder Wfl of the left wheel FL, the duty Di is modified to be the one added to the duty Di set in accordance with FIG. 4, by K2·(SaFR−SaFL)/2, wherein "K2" is a constant. Therefore, if the difference ΔSaF is of a positive value, it means that the slip rate SaFR of the right wheel FR is larger than that of the left wheel FL, so that the duty Di for the solenoid valve SI* disposed in the hydraulic pressure circuit including the wheel brake cylinder Wfl of the left wheel FL is modified to be larger than the other one. As a result, the hydraulic braking pressure in the wheel brake cylinder Wfl is modified to have an increasing characteristic, comparing with the characteristic as shown in FIG. 4. Or, the duty Di for the solenoid valve SI* disposed in the hydraulic pressure circuit including the wheel brake cylinder Wfr of the right wheel FR is modified to be smaller than the other one. As a result, the hydraulic braking pressure in the wheel brake cylinder Wfr is modified to have a decreasing characteristic, comparing with the characteristic as shown in FIG. 4. Consequently, the hydraulic braking pressure in the main passage MF in each of two hydraulic pressure circuits is controlled to be equal with each other.

According to the present embodiment, therefore, without controlling the solenoid valves PC1–PC8, i.e., held in the conditions as shown in FIG. 1, by controlling the solenoid valves SI*, SC*, the pressure in the two hydraulic pressure circuits is equalized, so that the noise which is caused when the valves are operated, will be minimized. Furthermore, the above-described control mode can be performed without closing the normally open solenoid valves PC1–PC4. Therefore, if the vehicle driver depressed the brake pedal additionally during the control mode is being performed, the master cylinder pressure could be supplied immediately to the wheel brake cylinders through the check valves AV1, AV2 and solenoid valves PC1–PC4.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A brake control system for a vehicle comprising:

wheel brake cylinders operatively mounted on front and rear wheels of said vehicle, respectively;

a master cylinder for pressurizing brake fluid to supply hydraulic pressure to said wheel brake cylinders in response to depression of a brake pedal;

a pair of main passages for communicating said master cylinder with said wheel brake cylinders to provide a dual hydraulic pressure circuit system;

a pair of first valve means for opening or closing said main passages, respectively;

a pair of pump means disposed between said first valve means and said wheel brake cylinders in said main passages, respectively, said pump means introducing from an inlet thereof the brake fluid and pressurizing the brake fluid to supply the hydraulic braking pressure to said wheel brake cylinders;

a pair of auxiliary passages for communicating each inlet of said pump means with said master cylinder;

a pair of second valve means for opening or closing said auxiliary passages, respectively;

wheel speed sensors for detecting wheel speeds of said wheels;

slip calculation means for calculating slip of said wheels on the basis of the wheel speeds detected by said wheel speeds sensors; and with said wheel brake cylinders operatively mounted thereon and disposed in different hydraulic pressure circuits, and placed at the left side and right side of said vehicle, respectively, when a difference between the slip of said wheels placed at the left side and right side of said vehicle exceeds a predetermined value when said two pump means introduce brake fluid from said master cylinder in said auxiliary pressure passages, respectively and supply the pressurized brake fluid to said wheel brake cylinders connected to the different hydraulic pressure circuits.

2. A brake control system as set forth in claim 1, wherein said control means is adapted to calculate a deceleration difference between a desired vehicle deceleration and an estimated vehicle deceleration calculated on the basis of the wheel speeds detected by said wheel speed sensors, and set a first duty of said first valve means and a second duty of said second valve means in accordance with the deceleration difference.

3. A brake control system as set forth in claim 2, further comprising a pressure sensor for detecting the hydraulic pressure discharged from said master cylinder, wherein said control means is adapted to set the desired vehicle deceleration on the basis of the hydraulic pressure detected by said pressure sensor.

4. A brake control system as set forth in claim 2, wherein said control means is adapted to modify at least one of the first duty of said first valve means and the second duty of said second valve means in at least one hydraulic pressure circuit of said dual hydraulic pressure circuit system, in accordance with the difference between the slip of said wheels placed at the left side and right side of said vehicle.

5. A brake control system as set forth in claim 1, further comprising modulator means disposed between said master cylinder and said wheel brake cylinders in each of said hydraulic pressure circuits for modulating the hydraulic braking pressure in each of said wheel brake cylinders in accordance with a pressure mode selected from at least a pressure increasing mode and a pressure decreasing mode, each inlet of said pump means being connected with a passage between said modulator means and said first valve means in each hydraulic pressure circuit.

\* \* \* \* \*